United States Patent
Gilmartin et al.

(10) Patent No.: US 7,013,242 B1
(45) Date of Patent: Mar. 14, 2006

(54) PROCESS AND DEVICE FOR REPRESENTATIVE SAMPLING

(75) Inventors: Stephen P. Gilmartin, Denver, CO (US); Marco Fedeli, Atlanta, GA (US)

(73) Assignee: Handrake Development LLC, Littleton, CO (US)

( * ) Notice: Subject to any disclaimer, the term of this patent is extended or adjusted under 35 U.S.C. 154(b) by 211 days.

(21) Appl. No.: 10/079,362

(22) Filed: Feb. 21, 2002

(51) Int. Cl.
*G06F 15/00* (2006.01)

(52) U.S. Cl. ....................... 702/189; 702/183

(58) Field of Classification Search .............. 702/189, 702/150, 183, 130, 216, 81; 235/380; 705/42, 705/3, 1, 40; 725/109, 93; 386/69, 83; 701/209, 701/201; 128/897; 600/300; 340/825; 703/11; 250/336.1; 73/863.01
See application file for complete search history.

(56) References Cited

U.S. PATENT DOCUMENTS

| | | | | |
|---|---|---|---|---|
| 4,628,748 A | * | 12/1986 | Jogan et al. | 73/863.01 |
| 5,067,099 A | * | 11/1991 | McCown et al. | 702/183 |
| 5,591,974 A | * | 1/1997 | Troyer et al. | 250/336.1 |
| 5,612,869 A | * | 3/1997 | Letzt et al. | 705/3 |
| 6,047,259 A | * | 4/2000 | Campbell et al. | 705/3 |
| 6,167,362 A | * | 12/2000 | Brown et al. | 703/11 |

* cited by examiner

Primary Examiner—Michael Nghiem
Assistant Examiner—Xiuqin Sun

(57) ABSTRACT

A method of conducting representative sampling is provided. In one embodiment, the method includes scheduling a plurality of observation prompts at bias-controlled times, in which the user is presented a series of items, called a tick list, for selection by the user; executing the scheduled observation prompts; accepting the user's selection(s) of items upon the observation prompts; counting the number of occasions on which each item is selected; and using the tick counts for representative sampling purposes. Additional features can render the method even more powerful and adaptable to diverse fields, and the method can be advantageously embodied in a computer based means. A user can thereby easily and inexpensively conduct representative sampling of nearly anything for which the user can develop a meaningful tick list.

10 Claims, 12 Drawing Sheets

| Tick Number | Description | Tick Count | Prevalence |
|---|---|---|---|
| 1 | Commuting | 40 | 20% |
| 2 | Working | 87 | 45.5% |
| 3 | Eating | 22 | 11% |
| 4 | Watching TV | 6 | 3% |
| 5 | Other | 45 | 22.5% |
| 6 | Total | 200 | 100% |

| KEY | TICK | TIME & DATE | LOCATION | TEMP. |
|---|---|---|---|---|
| 1 | 2 | 11/01/2001 09:31 | 53° 20' N  3° 59' W | 40 |
| 2 | 4 | 11/01/2001 10:47 | 52° 47' N  4° 15' W | 45 |
| 3 | 2 | 11/01/2001 11:08 | 54° 32' N  5° 21' W | 44 |
| 4 | 6 | 11/01/2001 13:54 | 52° 30' N  4° 42' W | 38 |

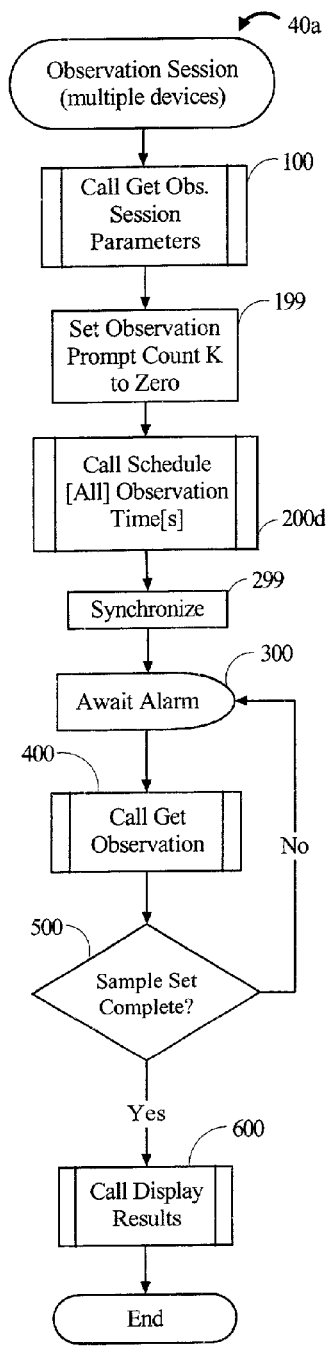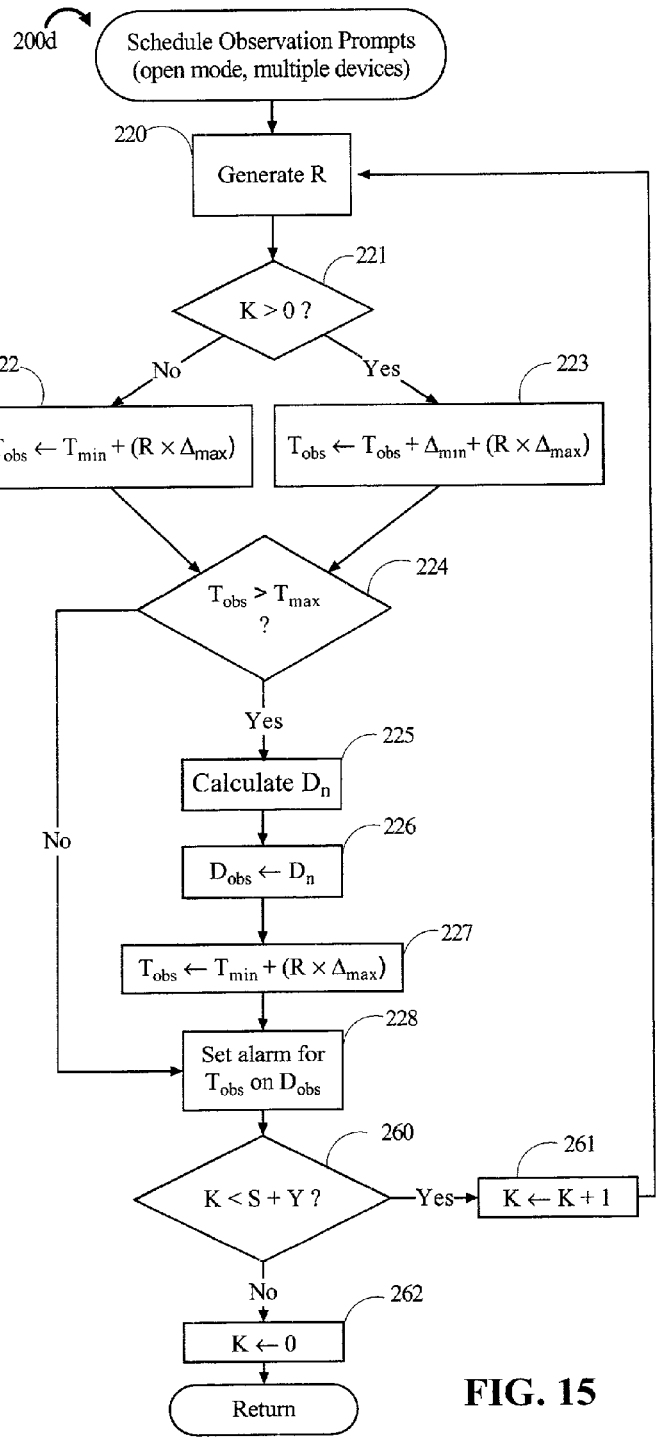
FIG. 14                                    FIG. 15

—Delete Rows

PROCESS AND DEVICE FOR REPRESENTATIVE SAMPLING

BACKGROUND OF THE INVENTION

1. Technical Field

The invention relates to a method for conducting representative sampling. More specifically, the invention relates to a convenient, versatile, simple, and inexpensive computer-based means of conducting representative sampling.

2. Description of the Prior Art

The ability to detect and reliably measure change is prerequisite to any sustained effort to bring about improvement. It is also prerequisite to meaningful experimentation. Presently available measurement tools for detecting change are problematic in most contexts, however, because most people, objects and processes can be difficult to quantify in many respects. One problem with prior art methods of quantification is measurement and sample bias. A very common measurement technique used for tracking worker productivity, for example, is the keeping of a time log. U.S. Pat. No. 5,991,742 (Tran, Nov. 23, 1999) discloses a state-of-the art embodiment of this method. The state-of-the-art device for application of this method is not only computer-based, but the host computer is a personal digital assistant (PDA). PDAs are compact, lightweight, and comparatively inexpensive, so that they may be carried in a pocket or even worn on the body. Even with such state-of-the-art methods and equipment, however, this time logging technique is prone to large error because it relies on the user to remember to record the various begin and end times of each activity. Users often forget. This logging method is also vulnerable to wishful thinking and inability to guess durations accurately. Similar problems plague myriad fields. Evaluation of proposed treatments for autism-related neurological disorders, for example, can suffer from similar observer bias and faulty memory.

Representative sampling can alleviate these difficulties. The essence of representative sampling is the use of some repeatable scale of measurement to make many observations at times or in a manner that is designed to avoid sample bias. Representative sampling has already been applied with great success in fields where measurement is easy, such as manufacturing. Application of this technique in non-manufacturing fields often requires great investment in infrastructure, however, as is apparent in social science experimentation, opinion polling and television viewership rating, to give just a few examples. Accordingly, in the prior art, representative sampling could not readily be applied to most fields.

There is therefore a need for a tool for representative sampling that can readily be applied to many fields. There is also a need for such a tool that is computer-based, and a further need for such a method and device that is portable, for use wherever the user happens to be. There is a still further need for such a tool that is convenient, versatile, simple and inexpensive to apply or use. There is an additional need for a method of representative sampling that improves upon the prior art.

SUMMARY OF THE INVENTION

By combining several tools and methods, a method and tool for applying representative sampling to almost anything can be provided. Five exemplary elements advantageously comprise the method and tool, and additional features would render it even more powerful. First, the tool must be capable of generating observation times that are chosen to avoid sample bias. Second, the tool must be able to schedule commands to be executed at the bias-controlled times. Third, the tool requires the capability of storing a plurality of potential descriptions for each observation ("tick list"). Fourth, it must be capable of presenting the tick list to the user at the scheduled times, so that the user can make an observation by selecting an item from the tick list. Fifth, the tool must be capable of accepting and storing the user's selections.

In addition to these five elements, the tool can be enhanced by the addition of a capability to attract the user's attention at the scheduled, bias-controlled times. Providing the tool with a capability to evaluate and present the accumulated results would still further enhance the tool's utility, as would configuring the tool so that the user has control over the items presented in the tick list(s). Making the tool inexpensive to obtain and operate also enhances utility. An even more powerful representative sampling tool, in addition to low cost, ease of use, and all the above-stated elements, would be capable not only of recording the user's selections from the tick list(s), but also of recording and cross-correlating such observations with their surrounding circumstances, such as time, date, and location of the observer at the time of the observation. Finally, over and above all of the foregoing, the most convenient tool for representative sampling would be have an easily portable component to allow the user to make and record observations wherever the user happens to be, and would also be capable of transmitting the recorded information regarding observations to another location for safe storage or analysis.

Of course, one skilled in the art will understand that one or more of these exemplary tool elements need not be used to achieve the purposes of this invention. Those skilled in the art will further recognize that one or more of these exemplary tool elements can be combined and/or performed with still other components.

Although some of these individual elements exist in the prior art, the synergy and combination of them yields a potent, novel and nonobvious result. Laptop and desktop computers, for example, are capable of integrating all the basic elements and features. Handheld or wearable computers such as personal digital assistants can do so, too, and are also compact, comparatively inexpensive, and easily portable. Existing applications for these computers, however, contain only approximations of only a few of the basic elements, and they contain no enhancements. For example, TimeOut™ message generator from Beoga Software prompts the user at random times to view healthful hints, like "relax your shoulders and breath deeply," but does not allow the user to control the content of those hints and does not permit the user to record any response. Similarly, the MMSE Mini-Mental Status Exam by Dr. Schmidt's Pocketdoc Software prompts the user to answer thirty multiple choice questions, then stores and evaluates the results, but does not prompt the user to respond to the questions at intervals calculated to control bias and does not allow the user to control the questions. Finally, myriad flashcard applications such as the HandyCards program from HandyMed, LLC allow users to compose virtual flash cards of the users' own choosing, then quiz themselves with those cards in random order. Such programs, however, do not present the cards at bias-controlled intervals, do not use any method of attracting the user's attention, and are not designed for the gathering of data.

In contrast, the invention provides a versatile, simple, and convenient means of conducting representative sampling that can be applied across many diverse fields. The potential ramifications of such a tool in the service industry alone are as profound as modern concepts of total quality management and the theory of constraints, for without a repeatable means of measurement, no such concept can be applied at all.

Accordingly, several objects of the present invention exist, including:

a) to provide a device and process for representative sampling which is simple, convenient, versatile and inexpensive;

b) to provide a device and process by which a user can conduct representative sampling of a wide variety of subjects in a wide variety of locations without being prompted to make observations at inopportune or useless times;

b) to provide a device and process by which a user can enter a list of possible descriptions, then be prompted by a computer at intervals calculated to control bias, but not at inopportune or useless times, to select a description from that list that corresponds to a contemporaneous observation by the user;

c) to provide a device and process by which a user can enter a list of possible descriptions, then be prompted by a computer at intervals calculated to control bias, but not at inopportune or useless times, to select a description from that list that corresponds to a contemporaneous observation by the user, wherein the results of an observation are recorded along with the date, time, location, or other facts regarding the circumstances of the observation, in order to facilitate analysis that accounts for these variables and any trends therein.

Equipped with the invention, a user can easily and inexpensively conduct representative sampling of anything for which the user can develop a meaningful tick list. Thus, the user may gather vital data without the constant vigilance required by the logging technique and with less of the unavoidable sample bias inherent in the data gathering methods of the prior art. More generally, the invention can be used to design and conduct repeatable experiments in fields in which the subjects of experimentation are difficult to describe in non-subjective terms. Such fields include, for example, social science, psychology, office productivity, and alternative medicine. Further, the invention's ability to correlate observations with the time, date and other factual circumstances of those observations allows detection and analysis of subtle trends that otherwise would difficult to find with the tools of the prior art.

Illustrations of the advantages of the invention are easy to imagine. In the field of billing clients for time, for example, representative sampling with the invention could be used to check the accuracy of traditional time-tracking methods such as those described in U.S. Pat. No. 5,991,742 and discussed above. In the medical field, representative sampling with the invention could be used to mitigate observer bias inherent in any effort to discern subtle changes in the behavior of children over extended periods of time, that could result from dietary influences, for example. The invention could further be used to detect, or even to define, conditions such as Asperger's Syndrome, which in the absence of the invention have been notoriously difficult to characterize quantitatively.

One skilled in the art will understand that other objects and advantages of the present invention exist. Further aspects, features and advantages of the present invention will become apparent from the drawings and detailed description of the preferred embodiments that follow.

DRAWING FIGURES

The above-mentioned and other concepts of the present invention will now be addressed with reference to the drawings of the preferred embodiments of the present invention. The illustrated embodiments are intended to illustrate, but not to limit, the invention. The drawings contain the following figures, in which like numbers refer to like parts throughout the description and drawings, and wherein:

FIG. 3 also includes a legend for the symbols in all flow charts of this application.

FIG. 14 is a flow chart illustrating an exemplary alternate embodiment of the exemplary main sequence of the computer application of the invention, whereby the observation prompting subroutine of FIG. 6 or FIG. 9 can execute substantially simultaneously on the two separate computer systems of FIG. 2 even if the two computers are no longer physically connected.

FIG. 15 is a flow chart illustrating an exemplary alternate embodiment of the observation scheduling subroutine of FIG. 10, wherein the subroutine is adapted to schedule all observation prompts for the sample set before returning to the exemplary main sequence, in order to facilitate the alternate main sequence of FIG. 14.

DETAILED DESCRIPTION OF THE INVENTION

A. Exemplary General Overview of Physical Requirements (FIG. 1)

Figure 1:
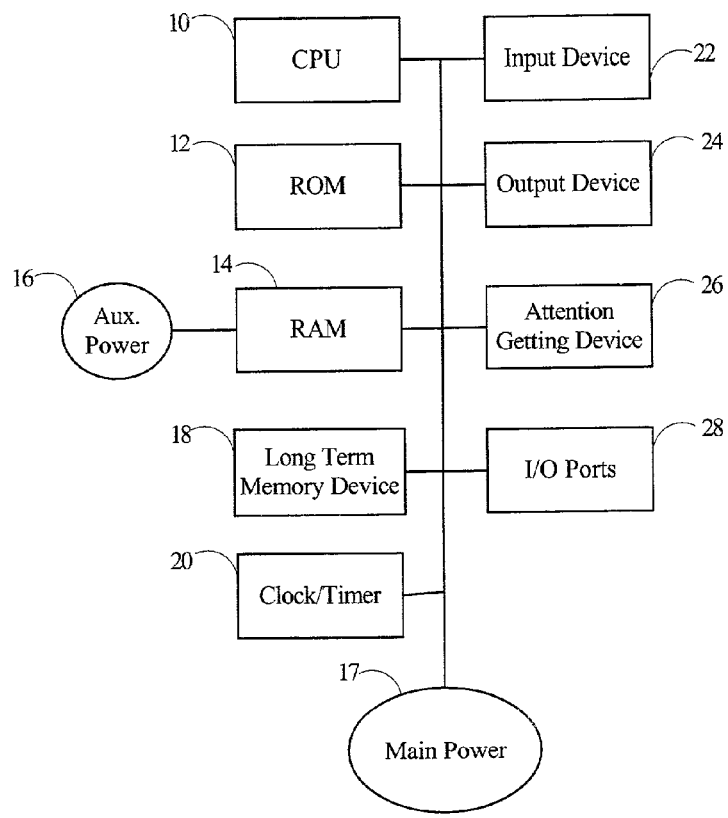
FIG. 1 is a block diagram of a computer system for representative sampling in accordance with the present invention.

FIG. 1 illustrates an exemplary computer system for representative sampling of the present invention. The system can be arranged in a small, hand-portable enclosure like common personal digital assistants (PDAs), such as Palm® PDAs, Sony® Clio® PDAs, and the like, whether presently known or later developed. The system can also be arranged in traditional laptop or desktop computers and the like, whether presently known or later developed.

The system illustrated in FIG. 1 is characterized by a general purpose architecture for interactively logging and manipulating data. A processor or central processing unit (CPU) 10 provides the processing capability for the representative sampling system of the present invention.

The processor 10 is connected to a read-only memory (ROM) 12 for receiving executable instructions as well as certain predefined data and variables. The processor 10 is also connected to random access memory (RAM) 14 for storing various run-time variables and data arrays, for example. The RAM 14 is sufficient to store user application programs and data. The RAM 14 can also be provided with a backup power source 16 such as a small battery to prevent loss of data when the computer system's main power source 17 is switched off or depleted. The processor 10 can further be connected to a long term storage device 18 such as an optical CD burner, magnetic disk drive, or flash memory card, for example, for purposes of storing user programs and data.

The RAM 14 or storage device 18 (or both) stores the database and operative variables of the present invention. As is known in the art, the database consists of various tables for storage of various user-defined values. The individual fields of the database and the individual operative variables are discussed below and illustrated in subsequent drawings describing the operation of the invention.

The processor 10 is also connected to clock/timer 20 which tracks time and date. The clock/timer 20 can be a dedicated integrated circuit for tracking time, for example, or a software clock wherein the time and date are derived from the clock signal regulating the processor 10. Further, the timer function of the clock/timer 20 can measure a duration count spanning one or more start times, as activated by commands from the processor 10, or by the user.

The computer system of the invention receives input from the user via an input device 22. The input device 22 can consist of a traditional keyboard or other configuration of pushbutton switches. It can also consist of a stylus, digitizer, and handwriting recognition software arrangement, such as those described in U.S. Pat. Nos. 5,463,696 and 5,991,742, which are incorporated herein by reference. The input device 22 can also consist of a speech recognition device and software, as also described in U.S. Pat. No. 5,991,742.

The computer system of the invention is also provided with an output device 24. The output device can be a liquid crystal display (LCD) or the like, or cathode ray tube monitor or equivalent, to give only a few examples. In common PDAs and touch-screen monitors, the input device and the output device are integrated as a pressure sensitive LCD. Audible and tactile output devices are also acceptable, practitioners of the art will recognize. Accordingly, this specification refers to presentation, rather than merely display, of information to the user, so as to include non-visual forms of communication.

The computer system of the invention is further provided with an attention-getting device 26 for attracting the user's attention. Examples of acceptable attention-getting devices 26 include a speaker capable of generating audible signals, and a motor driven, eccentrically mounted, rotating mass capable of generating vibration. Lights are also acceptable, of course, as are standard message boxes presented by the output device. Such boxes are commonly encountered in computer applications known in the art (and indeed, known to the general public).

Further, the computer system of the invention is provided with calendaring or other software, not shown in FIG. 1, that is stored in the RAM 14, ROM 12, long-term storage device 18, or some combination thereof. The calendaring software reads data from the clock/timer 20 and compares it with dates and times stored in the database. Persons skilled in the art will recognize that such data comparison is common, and forms the basis of scheduling applications such as appointment calendars and event schedulers. The calendaring software is also capable of receiving appropriately formatted input from the processor 10 or other sources and converting that input into future dates and times, then storing these future dates and times in the database. Similarly, the calendaring software is capable of comparing the stored dates and times with the current date and time and causing the processor 10 to execute specific instructions if one of the stored dates and times matches the current date and time or some derivative thereof. More specifically, when the calendaring software recognizes a particular date and time have arrived, it causes the processor 10 to execute commands that activate the attention-getting device 26 and initiate an observation prompt. The utility of these capabilities is further explained in the description of the operation of the invention, below.

Figure 2:
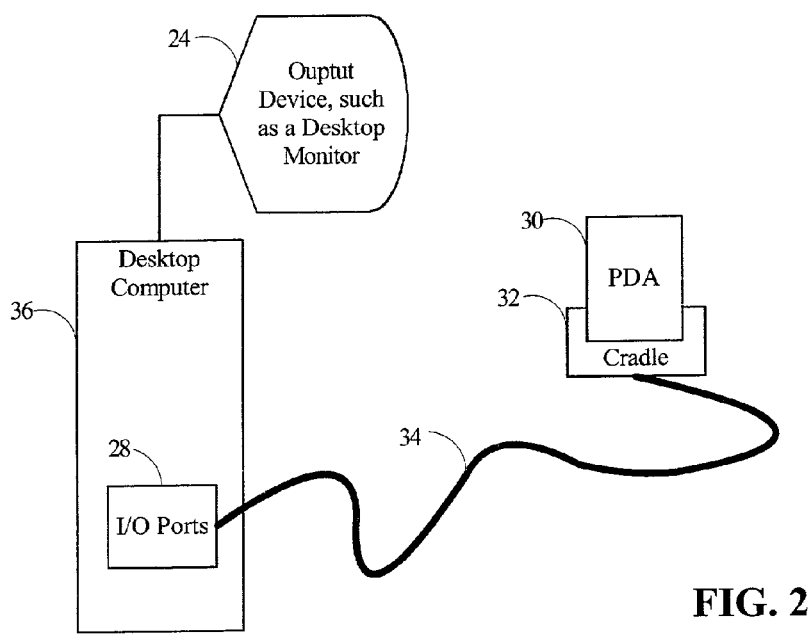
FIG. 2 is a schematic diagram of two computers, such as a desktop computer and a handheld computer, temporarily physically connected, linked together for representative sampling in accordance with the present invention.

In an exemplary alternative embodiment of the invention, a plurality of discrete computer systems, such as a handheld computer and a desktop computer, are linked together. Each computer system generally resembles the system described in FIG. 1, and has input/output (I/O) ports 28 by which the two computer systems can communicate with one another. FIG. 2 depicts this alternative embodiment. The I/O ports 28 are depicted in both FIG. 1 and FIG. 2. In FIG. 2, as shown, a handheld computer such as a PDA 30 is provided with a cradle 32. The cradle 32 connects to the I/O ports 28 of the handheld computer and is provided with a data transmission cable 34, which in turn is provided with a suitable connector such that the cable 34 may be electronically connected to the I/O ports 28 on a second computer such as desktop computer 36. The cradle, cable and connectors allow the two computers to compare and combine the data stored in their databases, eliminating duplicates and updating the databases resident on each computer with any changes entered on the other computer. This combination process is known in the art as synchronizing the handheld computer with the desktop computer, and uses synchronization software arrangements known in the art and sometimes called conduits. During operation, the synchronization software runs in the background of any or all host computers and listens for a synchronization request from any one of them. The operation and significance of this embodiment of the invention is explained below.

Figure 3:
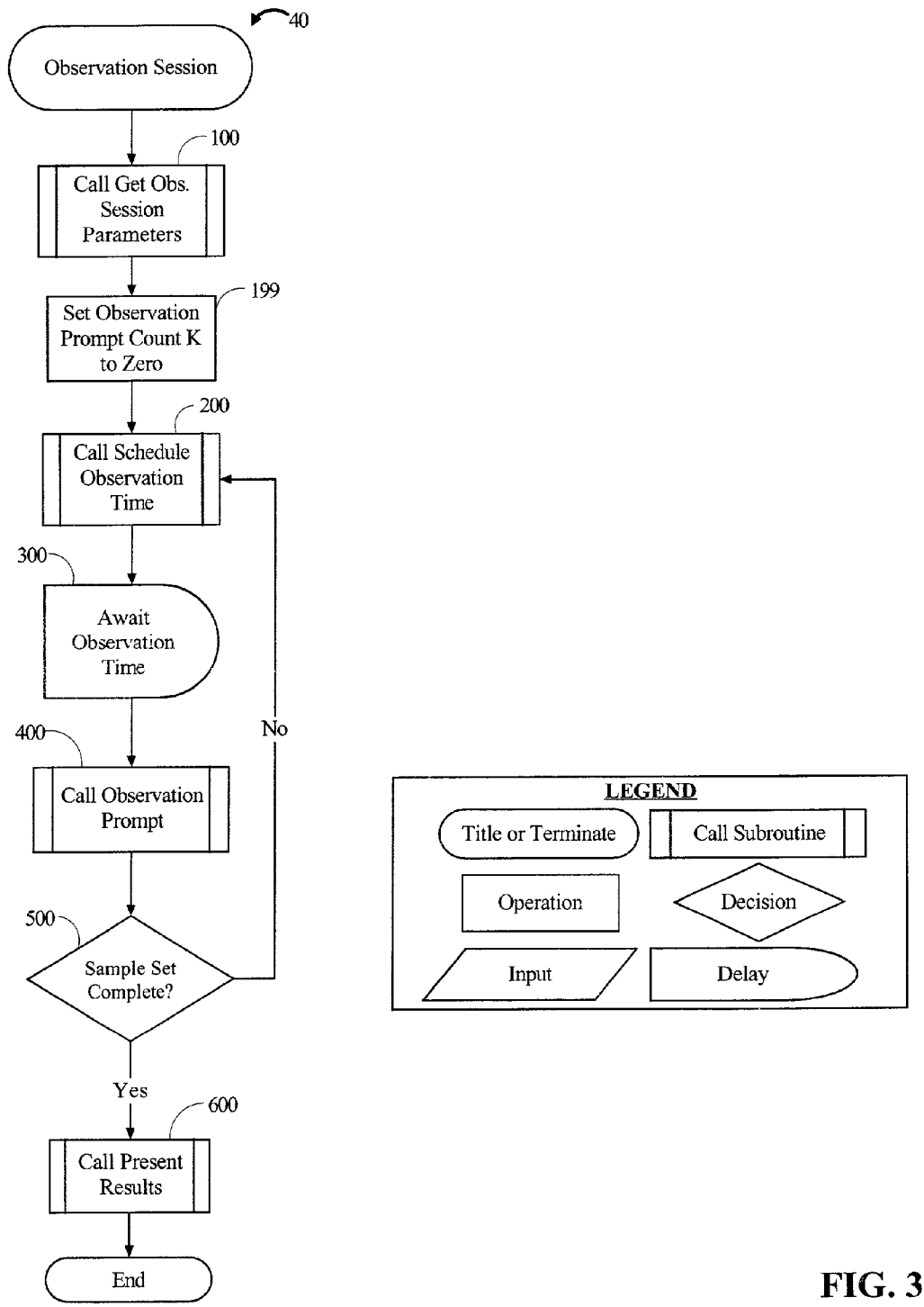
FIG. 3 is a flow chart illustrating an exemplary main sequence of the computer application of the invention.

A. Exemplary General Overview of Process (FIG. 3)

This process of gathering a complete sample set is called, collectively, an observation session. In an observation session, the invention functions by prompting the user at multiple times to make selections from a tick list of the user's choice, and then counting each such selection to build a complete sample set. The count of the number of times the user selects any given item on the tick list is the tick count for that item. The selection the user makes is called an observation. When the tick count for that item is incremented, the selection is said to be accepted. Acceptance of an observation can also include recording of other circumstantial facts regarding the observation, such as location and weather information, as more fully discussed below.

When the invention prompts the user to make an observation by making a selection from a tick list, the event is referred to as an observation prompt. If the user makes such a selection, that selection is also part of the observation prompt. A plurality of observation prompts can be executed contemporaneously by presenting multiple tick lists in succession, potentially resulting in multiple observations by the user. In the case of such multiple observation prompts, the population of the each tick list can be independent of, or dependent upon, the user's previous selection(s) or failure(s) to make selection(s).

The times chosen for observation prompts are calculated to control sample bias, and are therefore referred to as bias-controlled times. If predictability of observation prompt times is a potential source of significant sample bias, such as when observing one's own behavior, then the times are chosen so as to be substantially unpredictable by the user. Substantially unpredictability may be achieved with random times, for example, or by choosing times from a table stored in the memory and not generally familiar to the user, or by generating times according to some set of rules, the output of which is not readily predictable by the user with any substantial precision. If knowing the time of the next observation prompt is not a potential source of bias, such as when observing non-subtle changes in inanimate objects, then the times advantageously can be chosen by other, more predictable methods. In some situations, observation prompt times could advantageously be programmed to occur upon, or within a given interval before or after, other events, such as fifteen minutes after any ten point drop in the Dow Jones Industrial Average. Those skilled in the art will realize that myriad methods are available for control of bias in the selection of times, and that in many cases observation timing need not be used to control bias at all.

Since some potential times for observation prompts will be unsatisfactory regardless of potential for bias, such as when the user is usually sleeping, the invention allows the user to control the permissible times for observation prompts. Permissible times for observation prompts can be defined by a minimum and a maximum observation time, which, respectively, are the earliest and latest permissible times for an observation prompt on any given day. As more fully described below, some entire days will be unsatisfactory for observations. Accordingly, the invention can permit the user to specify blackout days. On blackout days, no observation prompts occur. In addition, the invention can count the number of observation prompts it executes. Further, also as described more fully below, the invention can permit the user to specify various modes by which bias-controlled times can be selected. Further still, by counting observation prompts as well as observations, the user can be given control over the desired sample set size, such that the desired sample set size is reached when the count of observation prompts equals the value the user enters for desired sample set size. These settings are collectively referred to as observation parameters. Of course, the number and nature of observation prompts could be modified, added to or reduced, depending on the particular application.

Figure 4:
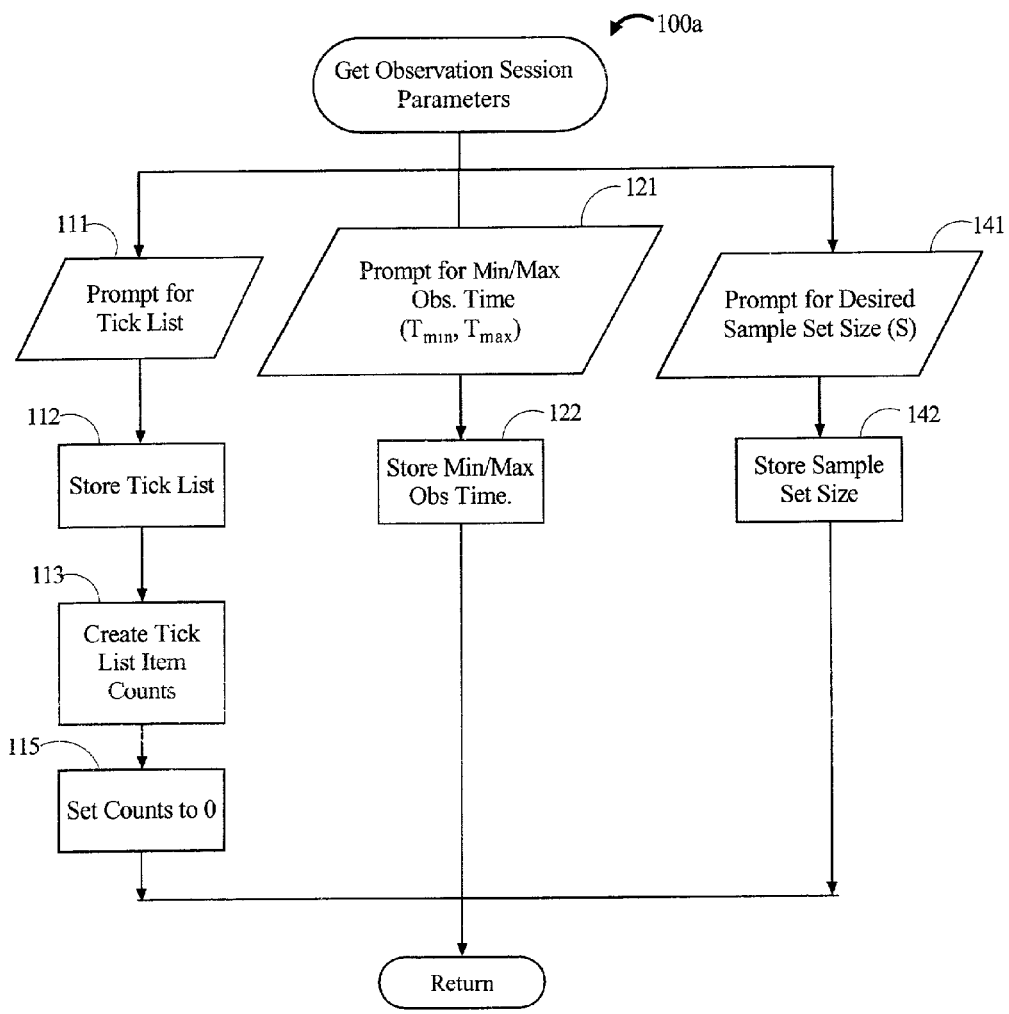
FIG. 4 is a flow chart illustrating an exemplary process for obtaining the basic observation parameters.

FIG. 3 depicts an exemplary main sequence or process 40 of this invention. Before beginning to gather a sample set of observations, at the outset of an observation session, the invention calls a first subroutine 100 whereby the invention prompts the user to choose at least one tick list. In choosing the tick list, the user might advantageously enter a batch of items herself, or select one of a plurality of batches of items provided to her for that purpose. Further, the batch of items—or tick list—might be selected at random. It could also be chosen according to external factors, such that different batches are presented under different weather conditions, for example. The user can also advantageously select earliest and latest permissible observation times and other observation parameters. As described more fully below, FIG. 4 depicts the exemplary main embodiment 100$a$ of this first subroutine 100 by which the observation session parameters are set.

Once the user chooses the tick list(s) and observation session parameters, as shown in FIG. 3 the invention in step 199 creates an observation prompt counter K. In the exemplary main embodiment, this counter K is used to keep track of the number of observation prompts that have occurred. Initially, it is advantageously set to zero.

Figure 5:
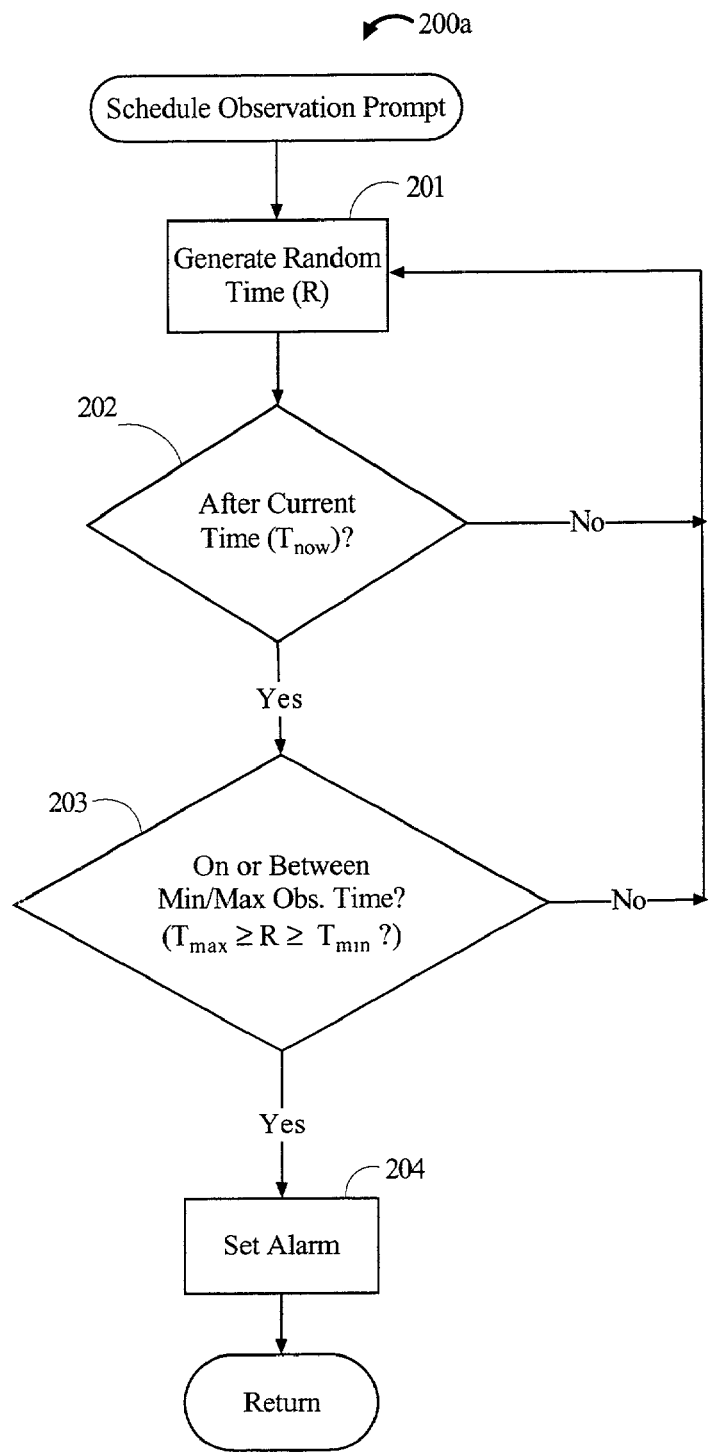
FIG. 5 is a flow chart illustrating a simple, exemplary process of the subroutine by which the invention sets an observation time, or in other words, schedules an observation prompt.

Next, the invention calls a second subroutine 200 whereby the invention (or other decision maker) sets an acceptable, bias-controlled time for an observation prompt and sets an alarm for that time. It is understood that setting an alarm simply means making use of the calendaring software to schedule an observation prompt for the acceptable bias-controlled time, whereby the computer will execute an observation prompt at that time. No actual alarm sound or purpose is necessary. Accordingly, this process of setting a future time at which the observation prompt will occur is called scheduling an observation prompt. FIG. 5 depicts this second subroutine.

Figures 6, 7:
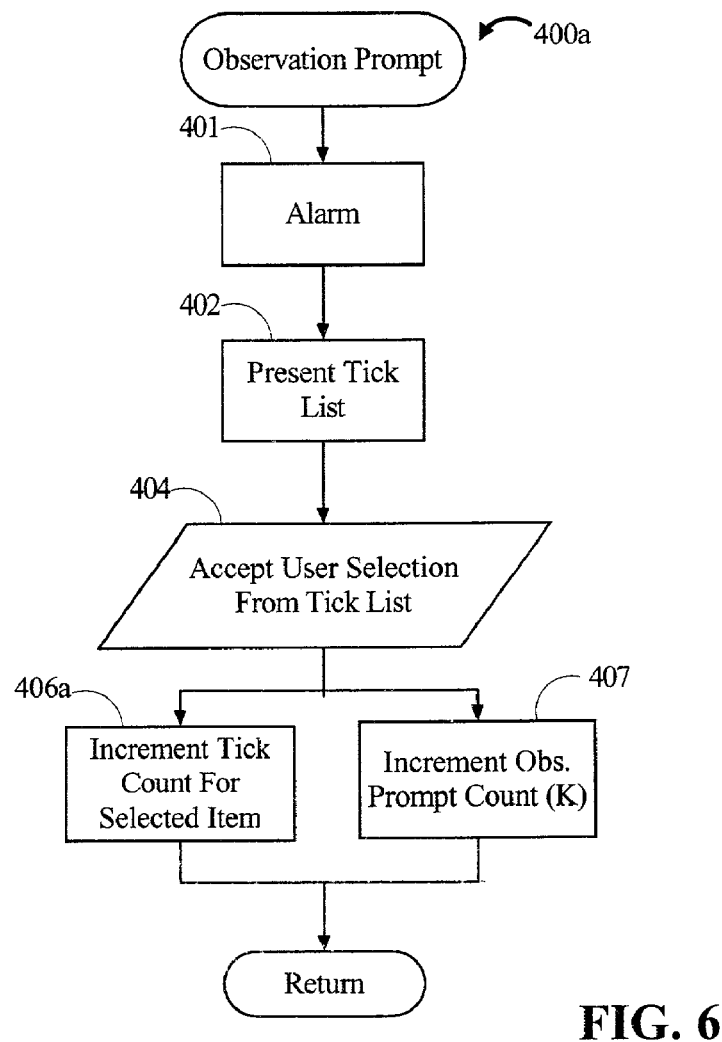
FIG. 6 is a flow chart illustrating an exemplary process of the most basic subroutine by which the invention prompts for an observation and records the result.
FIG. 7 is a tabular depiction of a basic arrangement by which the invention can present observation results.

Next, the invention waits through a delay 300, monitoring the clock/timer 20 until the observation time arrives. When the observation time arrives, invention calls a third subroutine 400 whereby it executes at least one observation prompt, prompting the user to make an observation and accepting the observation if made. FIG. 6 depicts the exemplary main embodiment 400$a$ of this subroutine 400.

Once the observation subroutine 400 is complete, FIG. 3 shows, the invention (or other decision maker) makes a decision 500 regarding whether the invention has executed enough observation prompts to complete the sample set. The invention (or other decision maker) determines whether the sample set is complete by counting the total number of observation prompts and comparing that cumulated total to the desired sample set size entered during the first subroutine 100. FIG. 3 shows that if the observation prompt count is less than the desired sample set size, the invention returns to the second subroutine 200, generating another bias-controlled time and repeating the observation prompt process.

When eventually the count of observation prompts equals the desired sample set size, the invention can execute a final subroutine 600 whereby it analyzes the sample set and presents the results. FIG. 7 shows one table by which the results can be presented. It is understood that presentation of results, or of tick lists during observation prompts, or of any other information to be communicated to the user, need not be by typical visual means such as characters on a view screen. Audio and tactile presentation of information to the user, for example, are also acceptable.

Then the observation session ends. Each of the exemplary subroutines is exemplarily described separately below.

B. Entry of Observation Session Parameters (FIG. 4)

At least three sets of user-defined variables can be used for the main embodiment of the invention. Accordingly, subroutine 100 in FIG. 3 gathers the helpful or necessary data. FIG. 4 is a flow chart depicting the exemplary main embodiment 100a of this observation parameter subroutine 100. In step 111 of FIG. 4, the invention prompts the user to choose a least one batch of items, advantageously consisting of a tick list, to be presented for potential selection upon observation prompts. Those skilled in the art will recognize that the user need not enter the entire list in order to be able to control its content. A user could select an entire list from a slate of lists, for example, and other methods of allowing the user to control the items to be presented for selection in observation prompts will be discernable to those skilled in the art.

In step 112, the chosen tick list is stored in memory. In step 113, the invention creates counters for each item on the tick list. In step 115, the invention advantageously sets all the counters to zero. (Step 114 is deliberately omitted here for use in an alternative embodiment shown in FIG. 8.) In step 121, the invention prompts the user to define the permissible time window in which to conduct the observation session by entering the minimum and maximum (i.e. earliest and latest) permissible times for observation prompts, $T_{min}$ and $T_{max}$. (Numbers of steps in adjacent vertical sequences are not sequential because alternative embodiments add steps to some sequences; compare, e.g. FIG. 4 with FIG. 8). The invention stores the values for $T_{min}$ and $T_{max}$ in step 122. In step 141, the invention (or other means) prompts the user to select a desired size S of the sample set to be obtained in the ensuing observation session. In the exemplary main embodiment, the invention simply prompts the user to enter a target number of observations, such as 50 or 1000. The value is stored in memory in step 142. As shown in FIG. 4, the three sets of data that comprise this particular set of observation session parameters may be entered in any order, but all must be entered before this embodiment 100a of the observation parameter subroutine 100 can complete and return to the exemplary main sequence 40 of FIG. 3.

C. Scheduling Observation Prompts (FIG. 5)

Once the observation session parameters are set, the sampling portion of the observation session can begin. The first part of the sampling process in the selection and scheduling of bias-controlled times for observation prompts. The invention advantageously provides a subroutine 200 to accomplish this purpose. An exemplary, very basic embodiment 200a of this subroutine 200 is depicted in FIG. 5, which shows use of random times for the control of bias. As discussed above, other means of controlling bias by time selection are also acceptable.

In step 201 of FIG. 5, the invention generates a random time, which may be any time in a twenty-four hour day. Methods of generating a random time are well known in the art. For example, one means for the Palm® operating system uses the number of times a stylus has made contact with the screen since the computer was last reset. The operating system keeps track of this number, which is essentially random. Since the operating system represents the time of day internally by the number of seconds passed since midnight of that day, one skilled in the art can generate a random time of day by calculating the number of seconds between midnight and the current time, squaring it, multiplying it by the stylus contact count, and adding one to it. The right-most six digits of the resulting figure will resemble an internal representation of the time of day, easily converted into a bias-controlled time for an observation prompt. The invention then stores the generated random time temporarily.

In step 202, the invention evaluates whether the generated random time is after the current time. If the generated random time is at or before the current time, it is rejected because the user cannot make an observation in the past, and the user will have just completed an observation (unless this observation prompt is the first in the observation session). The invention therefore returns to step 201 to generate a new random time, and repeats this process until it generates a random time in the future. When such a time has been generated, the invention can proceed from step 202 to step 203.

In step 203, the invention evaluates whether the generated random time is acceptable by comparing it to the observation session parameters. For example, in the most basic embodiment 200a, the invention compares the generated random time to the minimum ($T_{min}$) and maximum ($T_{max}$) permissible times for observation prompts. These comparisons are simple mathematical operations well known in the art. If the generated random time fails the comparison, the invention returns to step 201, generates a new random time, checks to see if the new time is after the current time, and then repeats the comparison with the new time. If the time is acceptable-meaning equal to either, or between, $T_{min}$ and $T_{max}$—the invention stores the generated random time in memory and proceeds to the next step. Steps 202 and 203 can be performed in the opposite order, as well, but both must be performed before the subroutine can complete.

In step 204, once an acceptable random time has been generated, the invention schedules an observation prompt for that time. In FIG. 5, this step is described as setting an alarm. Applications and extensions are readily available for this purpose. For example, AMS Alarm Manager from Antelligent Microsystems (www.antelligent.com) for the Palm® operating system can be used. The AMS Alarm Manager will cause the computer to initiate an observation prompt at the scheduled time. As mentioned above, however, it is understood that setting an alarm simply means making use of the calendaring software to schedule an observation prompt for the acceptable bias-controlled time, whereby the computer will execute an observation prompt at that time. The subroutine 200 then terminates and returns to the exemplary main sequence 40 of FIG. 3, whereupon the invention begins to wait through delay 300 until the scheduled observation time.

D. Observation Prompt (FIG. 6)

As described above and shown in FIG. 3, after the invention schedules an observation prompt to occur at an acceptable, bias-controlled time, the invention executes a delay 300 calculated to expire when the scheduled time arrives. When the delay 300 expires, the invention executes a subroutine 400 whereby the invention initiates an observation prompt.

When an observation prompt is initiated, as depicted in FIG. 6, in step 401 the exemplary main embodiment 400a of the observation subroutine 400 first triggers an attention-getting device like an audible or tactile buzzer, light, displayed message box, or combinations thereof. This process is therefore described as setting an alarm in FIG. 6, as it was in FIG. 5. The attention-getting device can be integrated with the computer or separate from it. The AMS Alarm Manager described above can be used to trigger the attention-getting device at the scheduled time. The attention getting step is advantageous for reducing the number of times the user is unaware of observation prompts, but is not crucial to the basic embodiment of the invention.

Contemporaneously with advantageously attracting the user's attention, the invention executes the process herein referred to as an observation prompt. In an observation prompt, as described above, the invention in step 402 first presents to the user a batch of items herein referred to as a tick list. In step 404, the invention prompts the user to select an item from the list. The user may do so through the input device. (Step 403 is reserved for use in an alternate embodiment shown in FIG. 9.) In the exemplary main embodiment, the output device may comprise a touch sensitive LCD screen equipped with a digitizer, allowing the output device also to function as an input device. Accordingly, selection of an item on the tick list requires the user merely to tap the location where that item is displayed on the output device. Other methods of accepting and storing the user's input are also known in the art. In step 406a, the invention increments the tick count corresponding to the tick list item the user selected, thereby accepting the selection. (Step 405 is reserved for use in an alternate embodiment depicted in FIG. 9; step 406a is represented with a numeral as well as a letter because the alternate embodiment of FIG. 9 has a similar step 406b.) In step 407, the invention increments the observation counter K by one. Steps 406a and 407 can occur in either order, but both steps should be executed before this subroutine 400 completes and returns to the exemplary main sequence 40 of FIG. 3.

E. Analyzing & Presenting Sample Set Results (FIG. 7)

If the invention (or other decision maker) determines in step 500 in FIG. 3 that the sample set is complete, the invention can execute a subroutine 600 whereby it analyzes and presents the results of the sample set. Analysis of the results can include dividing each tick count by the desired sample set size in order to derive the relative percentage of the sample set represented by the tick list item(s) associated with that tick count. Presenting the results can include displaying each tick list item, or a suitable designator therefore, along with the tick count for that item and its prevalence in the sample set as indicated by the calculated percentage. Indication of statistical confidence intervals and the like would also be advantageous. FIG. 7 depicts a table that can be used for the display of results.

F. Alternative Embodiments

Exemplary alternative embodiments of the invention may include one or more of the following additional features. Also, as will be understood by those skilled in the art regarding the above exemplary main embodiment, certain elements, steps, order, and decisions need not be performed as particularly described above, but can be performed by other suitable mechanisms, devices or means to accomplish the spirit and scope of this invention.

Figure 8:
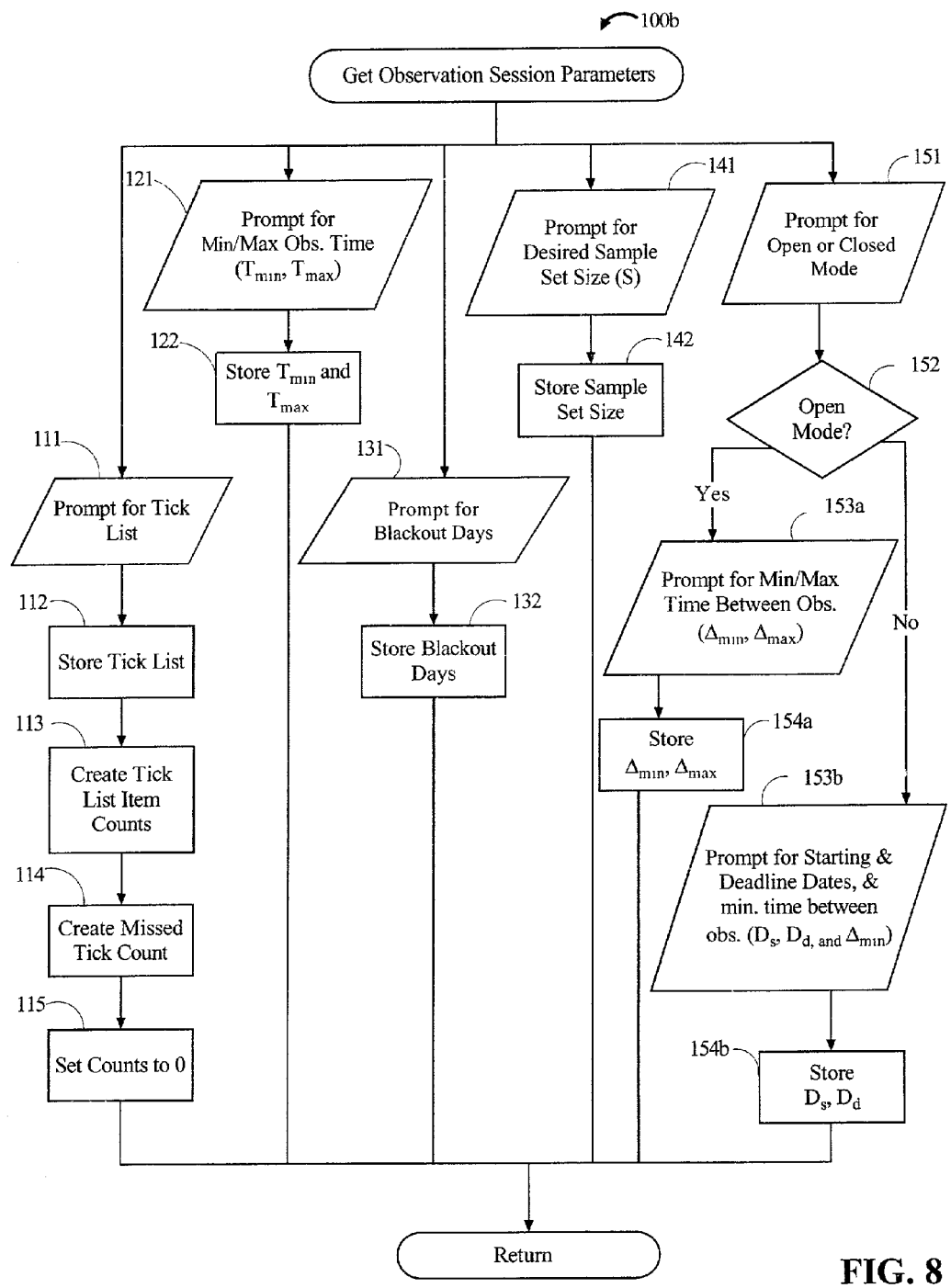
FIG. 8 is a flow chart illustrating an exemplary alternate embodiment of the observation parameter obtainment subroutine of FIG. 4, whereby the invention obtains a greater number of more complex observation parameters.

1. Allow Blackout Days (FIG. 8)

In the exemplary main embodiment, the principle criteria for acceptability of bias-controlled times for observation prompts are whether it is after the current time and whether it is within the permissible observation prompt time window bounded by $T_{min}$ and $T_{max}$. All dates and days of the week are treated the same way. An alternative exemplary embodiment of the invention offers greater control over permissibility of observation prompt times by allowing the user to specify dates and days of the week on which observation prompts are not permitted, such as weekends and holidays. Days and dates when sampling is permitted are called sampling days; the remainder are blackout days.

Implementation of this feature requires additions to the observation parameter subroutine as well as the observation prompt scheduling subroutine. FIG. 8 shows an appropriate alternate embodiment 100b of the observation session parameter subroutine 100. In step 131 of this embodiment, the invention prompts the user to select blackout days, and after the user does so, the invention stores them in step 132. Blackout day selection may occur in any order with the selection of other parameters.

Figure 9:
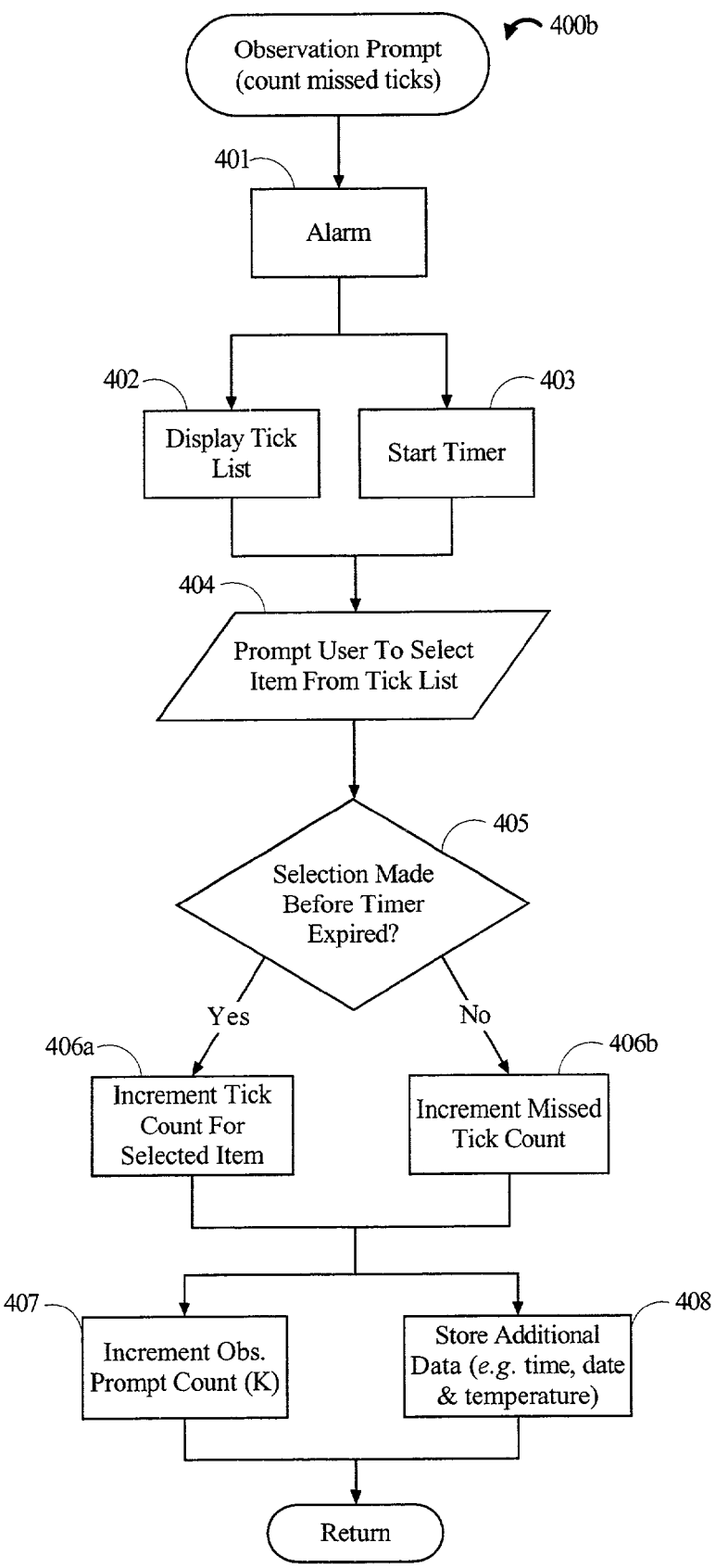
FIG. 9 is a flow chart illustrating an exemplary alternate embodiment of the observation prompting subroutine of FIG. 6, whereby the invention accounts for the possibility that users may not actually record any observation, despite the execution of an observation prompt.
Figure 10:
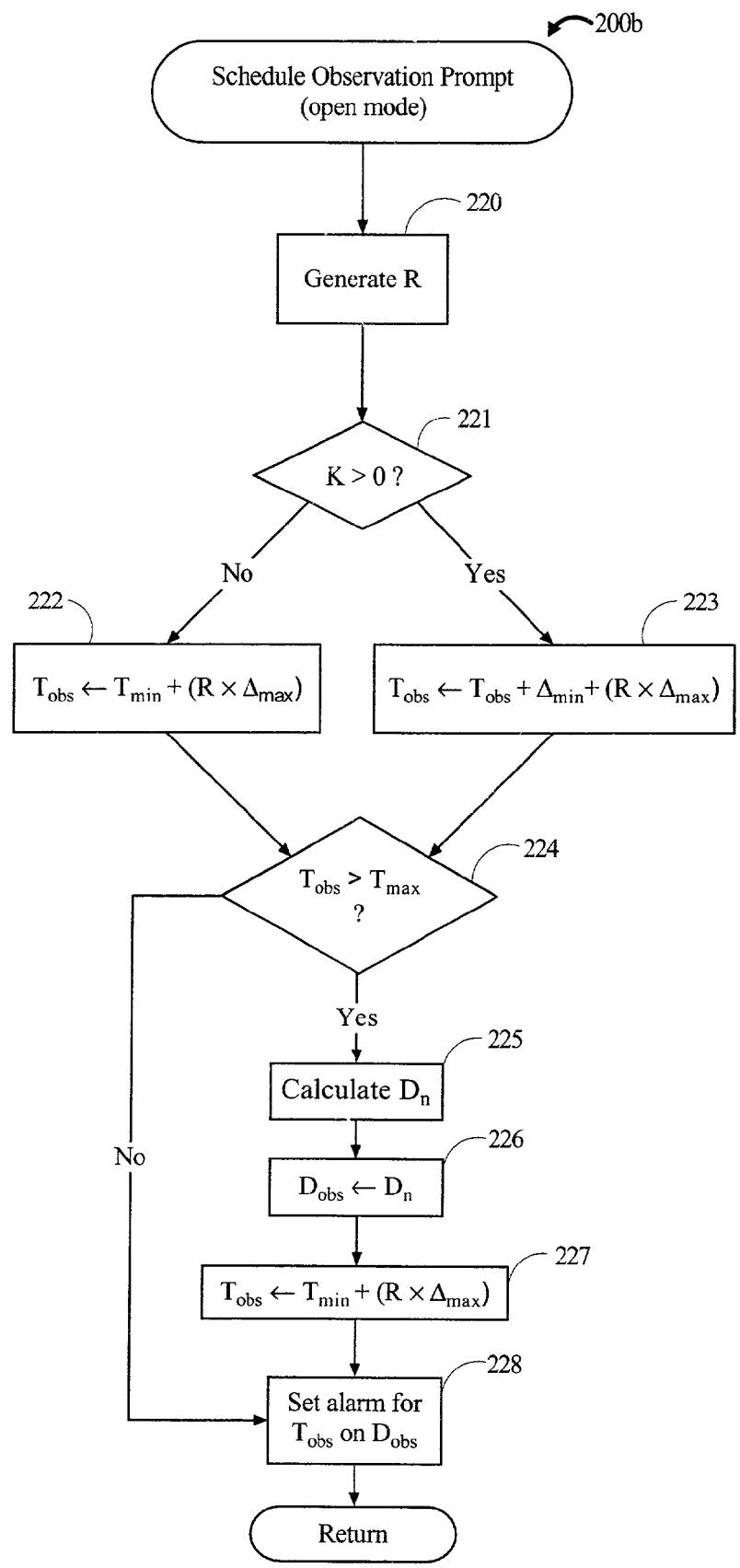
FIG. 10 is a flow chart illustrating an exemplary alternate embodiment of the observation prompt scheduling subroutine of FIG. 5 called open mode, whereby the invention not only accounts for blackout days on which no observation prompts are permitted, but also schedules observation prompt times according to minimum and maximum permissible durations between observation prompts.

Use of blackout days in the scheduling subroutine is depicted in FIGS. 9 and 10, along with other additional features described below. Such use does not require extraordinary skill in the art.

2. Count Missed Observations

During operation of the invention, it is likely that for at least some observation prompts users will not be in the immediate vicinity of their desktop computers, or will not have brought their handheld computers with them, or otherwise will not be able to respond. On such occasions, it is an advantage to treat the observation as missed, rather than to wait however long it takes for the user to return to the computer and make an observation. Accordingly, an alternative embodiment 400b of the observation subroutine 400 also counts missed observations, allowing for more sophisticated analysis of the sample set.

FIG. 8 shows that in order to implement this feature, an exemplary alternative embodiment 100b of the observation parameter subroutine 100 creates a counter for missed observations in step 114. In step 115, this embodiment advantageously sets the missed tick count to zero, along with the other tick counts.

FIG. 9, correspondingly depicts the alternate embodiment 400b of the observation subroutine 400 of FIG. 3. After advantageously attracting the user's attention in step 401, the invention in this embodiment starts a timer in step 403 at substantially the same time as it presents the tick list in step 402. It step 404, the invention prompts the user to make a selection from the batch of items being displayed. Then the invention waits no longer than a predetermined period of time, such as one minute, while listening for any selection the user might make. In step 405, the invention determines whether the user has made an observation by selecting an item from the tick list before the predetermined time expires. If a selection has been made, in step 406a the invention increments the counter for the selected tick list item. Otherwise, in step 405b the invention increments the missed tick count $K_m$. Whichever tick count is incremented, if there are no further observation prompts to be executed, the observation subroutine then terminates and returns to the exemplary main sequence 40 in FIG. 3.

3. Open Mode: Observation Times Determined By Duration Between Observation Prompts (FIG. 10)

In the main exemplary embodiment the user can control the earliest and latest permissible observation prompts in a day, but lacks control over the duration between observation prompts in any given day. A user might want observations no more frequently than once every hour, for example, but might also want at least one observation every 45 minutes. In an alternate embodiment, the user can control both. In this alternative embodiment 100b of the observation parameter subroutine 100, shown in FIG. 8, the user can choose the earliest ($T_{min}$) and latest ($T_{max}$) permissible observation times in a day, and may also specify the minimum ($\Delta_{min}$) and maximum (Amax) durations between any two observations in a day. Alternatively, $T_{min}$, $T_{max}$, $\Delta_{min}$, $\Delta_{max}$, can beneficially be determined by other factors, internal or external. Whatever the method, it is advantageous to ensure that these times and durations are predetermined in order to benefit the user. This alternative embodiment is called open mode sampling. It is called open mode because there is no set deadline-sample times are governed by the user's willingness to make observations only at certain intervals.

FIG. 10 shows an exemplary embodiment 200b of an open mode observation prompt scheduling subroutine 200 of FIG. 3. In FIG. 10, the bias-controlled time is selected at random, as opposed to other methods of bias control, but other methods are acceptable. As shown in FIG. 10, the invention begins the selection process by generating a first random number R in step 220. R is between zero and one.

Then in step 221, the invention checks to see whether the observation prompt to be scheduled is the first in the observation session by checking to see if the observation prompt count K is still zero. If K is still zero, then in step 222 the time for the first observation prompt $T_{obs}$ is selected by adding the earliest permissible observation time $T_{min}$ to the product of the random number R and the maximum permissible duration between observations $\Delta_{max}$. If the observation prompt count is not zero—meaning this is not the first time in the session that the invention is scheduling an observation prompt—then in step 223 the invention adds the minimum permissible duration between observations $T_{min}$ to the most recently used observation time $T_{obs}$ to generate the earliest permissible next observation time. Then to that figure, the invention adds the product of the random number R and the maximum permissible duration between observations $\Delta_{max}$. The result becomes the next observation prompt time.

In step 224 the invention determines whether the result of this time selection process is a time that is earlier than the latest permissible observation time on the current day. If so, then the current date remains the date for the next observation $D_{obs}$.

On the other hand, if the calculated observation time is later than the latest permissible observation time on the current date, then the invention makes two adjustments. First, in step 225 the invention calculates the date of the next permissible sampling day $D_n$ (skipping blackout days) and, in step 226, changes the date for the next observation $D_{obs}$ to match. Second, in step 227 the invention changes the observation time back to the earliest permissible observation time $T_{min}$ plus the product of the random number R and the greatest permissible duration between observations $\Delta_{max}$. Once the observation date $D_{obs}$ and observation time $T_{obs}$ are determined, in step 228 the invention schedules the observation prompt accordingly. FIG. 10 uses the term "set alarm" for this step, the meaning of which is described above. Then this embodiment 200b of the observation prompt scheduling subroutine 200 of FIG. 3 ends and the invention returns to the exemplary main sequence 40 of FIG. 3.

Figure 11:
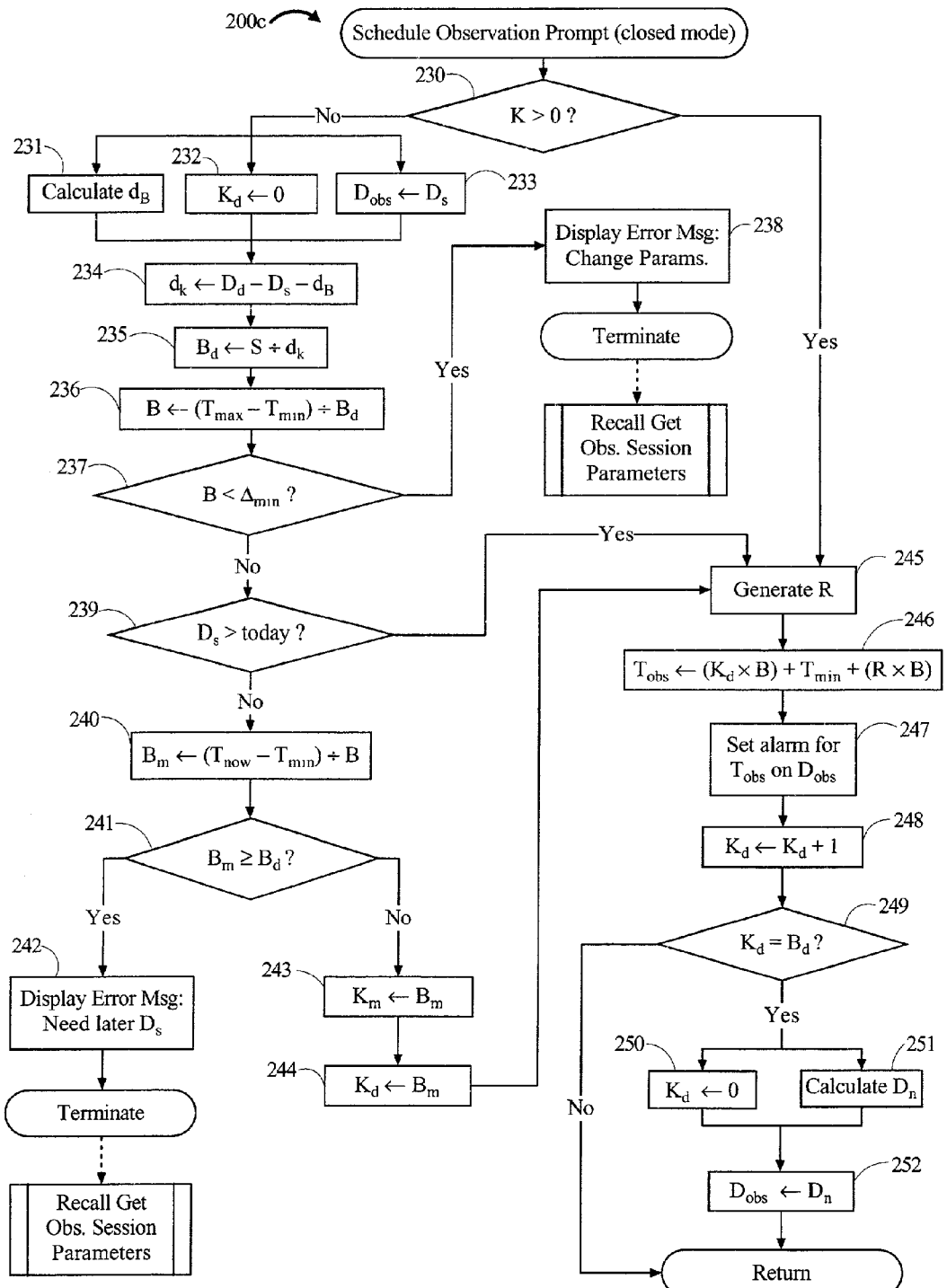
FIG. 11 is a flow chart illustrating an exemplary alternate embodiment of the observation scheduling subroutine of FIG. 5 called closed mode, whereby the invention not only accounts for blackout days on which no observation prompts are permitted, but also schedules a user-determined number of observation prompts according to and before a user-determined deadline.

4. Closed Mode: Observation Times Determined By Sample Set Completion Deadline (FIG. 11)

The open mode can permit users to control the duration between observations, but might not permit users to specify a deadline for completion of the sample set. Users, however, may wish to make a priority of ensuring completion of a sample set of a predetermined size before a certain deadline, which sometimes will require extremely frequent observation prompts. Accordingly, another alternative embodiment of the observation parameter subroutine 100 in main sequence 40 of FIG. 3 allows users to specify a deadline date $D_d$ for completion of the desired sample set as a further observation session parameter. This deadline parameter is advantageously used instead of, not in addition to, the parameter for maximum duration between observations $\Delta_{max}$. This embodiment, exemplarily depicted in FIG. 11, also provides an opportunity for the user to specify a start date $D_s$—be it the current date or a later date—for the observation session. The start date, too, is to be entered in a variation of the observation parameter subroutine. The observation parameter subroutine should not allow a date in the past to be used as the start date for a new session. Determination of observation prompt times by use of a start date and deadline date instead of minimum and maximum duration between observations is called the closed mode of conducting an observation session, because the end point is known with precision.

In an exemplary embodiment of the closed mode observation session, the invention divides all the available time between the earliest permissible sampling time $T_{min}$ on the start date $D_s$, and the latest permissible sampling time $T_{max}$ on the deadline date $D_d$ into blocks of equal duration B. Then one observation prompt is scheduled at a random time within each block. To illustrate, a user may set weekend days as blackout days, and may further specify that observation prompts cannot occur earlier than 9:00 am or later than 5:00 pm. The user might require a sample set of 500 observations, and may need to complete the entire set within two weeks. Accordingly, in closed mode the invention can advantageously divide all the time between nine and five each weekday into blocks of 546 seconds each, then prompt the user to make an observation once in each of those blocks. (28,800 available seconds between 9:00 am and 5:00 pm each day times 10 weekdays divided by 500 observations equals 546 seconds per block; accordingly, the first block each day is from $T_{min}$ to $T_{min}$+546 seconds; the second is from $T_{min}$+546 to $T_{min}$+1092, the third is from $T_{min}$+1092 to $T_{min}$+1638, and so on.)

In addition, the invention can advantageously allow the user to set a desired minimum duration between observations $\Delta_{min}$ in closed mode as well as open mode. Then, if the calculated block size B is less that the desired minimum duration between observations $\Delta_{min}$, the invention should alert the user that the desired sample set cannot be completed by the desired deadline without violating at least one of the user's other observation parameter settings. In that event, the invention can advantageously prompt the user to alter the parameters. The user can then choose among reducing the desired size of the sample set, extending the deadline, changing the earliest and latest permissible prompt times, or reducing the desired minimum duration between observations, for example.

FIG. 11 depicts an exemplary embodiment 200c of this closed mode of the scheduling subroutine 200 of FIG. 3. As in the open mode embodiment 200b of the same subroutine, in the closed mode the invention first determines in step 230 whether it is setting the very first observation prompt time in the observation session. If so, then block size must be determined.

To determine block size, in steps 231 through 233, the invention sets the observation date $D_{obs}$ to the start date $D_s$, sets a counter for the number of observation prompts set that day $K_d$ to zero, and calculates how many blackout days $D_B$ exists between the start date $D_s$ and the deadline date $D_d$. These steps can occur in any order, but it is certainly helpful to complete them all before moving on to the next step 234.

In step 234, the invention calculates the available number of sampling days by subtracting the starting date $D_s$ and number of blackout days $d_B$ from the deadline date $D_d$. Then in step 235 the invention calculates the number of blocks necessary for each sampling day $B_d$ by dividing the desired size of the sample set by the available number of sampling days $d_k$. Finally, in step 236 the invention determines the block size—the amount of time in each block—by subtracting the earliest permissible observation time $T_{min}$ from the latest permissible observation time $T_{max}$ to yield the amount of available time in each sampling day, and then dividing the result by the number of blocks necessary for each sampling day $B_d$.

Having determined the necessary block size, the invention can then account for two possibilities. First, the block size may be less than a predetermined minimum permissible duration between observation prompts. This minimum may be user-defined, like $\Delta_{min}$, or may have a default value, such as one minute, or it can be determined by other methods which will be apparent to those skilled in the art. The invention makes this determination in step 237, and if the block size is too small, displays an appropriate error message in step 238, prompting the user to adjust the observation parameters by returning to the observation parameter subroutine 100 of FIG. 3. The scheduling routine then terminates.

Second, even if the block size B is sufficiently large, the user may have initiated the observation session sometime after the earliest permissible observation time on the start date $D_s$. If so, then some blocks have been missed. Accordingly, in step 239 the invention determines whether the current day is the starting date. If the current date is the start date, then in step 240 the invention determines how many blocks $B_m$ have already at least partially passed and are consequently unavailable for observation prompts. Here, the invention subtracts the earliest permissible observation time $T_{min}$ from the current time $T_{now}$ and divides the result by the block size B.

Once the number of missed blocks $B_m$ is known, the invention can determine whether there are any blocks remaining in the current day. Accordingly, in step 241 the invention compares the number of missed blocks $B_m$ with the number of blocks necessary for each day $B_d$. If at least as many blocks have been missed as are necessary, it would be better to start the session on another, later date. Therefore, in step 242 the invention advantageously displays an error message prompting the user for a new, later start date. The user would enter one by returning to the observation parameter subroutine 100 of FIG. 3. If there are still some useable blocks left in the current day, the invention in step 243 treats the observation prompt that otherwise would have occurred in each of the missed blocks as having resulted in a missed tick, and increments the missed tick counter $K_m$ accordingly. That is, it changes the missed tick counter from zero to the value of the missed block count $B_m$. It would be advantageous, of course, to adjust these figures to their appropriate, integer form. In step 244, the invention also adjusts a counter for prompts during the current day $K_d$, setting the counter equal to the missed block count $B_m$. This step ensures that the next observation time will be set in the appropriate time block.

If no blocks have been missed, if the start date $D_s$ is after the current date, or if the observation prompt to be scheduled is not the first prompt in the session, the invention moves on to step 245. In that step, the invention generates a random number R, between zero and one. Then in step 246 the invention sets the next observation time $T_{obs}$ by summing three numbers: the minimum permissible observation time $T_{min}$; the product of the random number R times the block size B; and the product of the block size B and the count of observation prompts already scheduled on the current day $K_d$.

In step 247 the invention schedules the observation prompt for the chosen time $T_{obs}$ on the current observation day $D_{obs}$. Having done so, in step 248, the invention increments the count of observation prompts already scheduled that day $K_d$ by one.

Then the invention can check to see whether all blocks have been used for the current day. It does so in step 249 by comparing the daily observation prompt count $K_d$ with the calculated number of blocks per day $B_d$ from step 235. If these values are not yet equal, then there are more blocks to be scheduled with observation prompts on the current day, and the subroutine simply returns to the exemplary main sequence. If the number of prompts equals the necessary number of blocks per day, then the next available block is on the next sampling day, not before. Accordingly, in steps 250 and 251, in either order, the invention resets the daily prompt count $K_d$ to zero and calculates the date of the next permissible sampling day $D_n$ (skipping blackout days). Next, in step 252 the invention changes the date of the next observation prompt from the current day to the next sampling day $D_n$, before completing the subroutine and returning to the exemplary main sequence 40 in FIG. 3.

5. Allow Choice Between Open and Closed Modes

Another alternative embodiment of the invention allows the user to choose whether to use the open mode or closed mode by entering that choice as an observation parameter in subroutine 1100. FIG. 8 depicts an exemplary embodiment 100*b* of that subroutine. The user is prompted to enter her choice in step 151. If the user chooses the open mode, which the invention detects in step 152, she is prompted to enter the minimum and maximum permissible durations between observations ($\Delta_{min}$ and $\Delta_{max}$) in step 153*a* and the invention stores that input in step 154*a*. If the user chooses the closed mode, the invention prompts her in step 153*b* to enter the starting date $D_s$, deadline date $D_d$, and desired minimum duration between observations $\Delta_{min}$. The invention stores these values in step 154*b*. Then, during the observation session, the invention detects whether it is operating in open or closed mode before calling the scheduling subroutine 200, and calls embodiment 200*b* or 200*c* (FIG. 10 or 11) of that subroutine accordingly.

6. Judge Sample Size By Actual Observations Made

In the exemplary main embodiment, the invention advantageously judges completion of the sample set by comparing the total number of observation prompts K in step 500 of FIG. 3 with the desired sample set size S that the user enters in step 141 of the observation parameter subroutine 100. An alternative embodiment of the invention includes the ability to count missed observations $K_m$ as described above and then to judge completion sample set by comparing only actual observations—not missed ticks—with the desired sample set size S. More specifically, in this alternative embodiment, the invention in step 500 of FIG. 3 sums all the all tick counts except for the missed tick count $K_m$, or alternatively subtracts the missed tick count $K_m$ from the observation prompt count K, and proceeds to step 600 only if comparison of that figure with the desired sample set size S reveals that the user has made the desired number of actual observations. Otherwise, the invention schedules and executes at least one more observation prompt. Another embodiment allows the user to specify which tick count(s) should be used to determine whether the desired sample size has been achieved. This latter embodiment further requires corresponding alteration of the observation parameter subroutine 100 (not shown). The advantage of these features is that they ensure the sample set includes sufficient actual observations of the desired type for the user's needs.

7. Store Additional Information Regarding The Observation.

In the exemplary main embodiment, the computer device and process of the invention advantageously record observations by recording the user's selections from tick list(s). An alternate embodiment also records other objective circumstances of the observations, such as the time and date of each tick. FIG. 9 shows that this additional information would be stored as step 408 in an alternate exemplary embodiment of the observation prompt subroutine. As shown in FIG. 9, incrementing the observation prompt count (step 407) and storing the additional information such as time and date of the tick (step 408) can occur in either order, but it is helpful to do both before the subroutine terminates and returns to the exemplary main sequence.

In still another embodiment, the computer system is provided with a means of detecting geographical position, such as a Global Positioning System chip and software, and the invention records not only the tick, and the time and date of the tick, but also the user's location at the time of the tick. Still other embodiments similarly include sensors or means of detecting other objective circumstances of observations, such as: location; depth or altitude (water or air pressure); weather conditions (like temperature, barometric pressure, humidity and such); vital statistics (like pulse and blood pressure); direction of travel or of orientation of the device; acceleration; or chemical content. In each case, the invention advantageously records these circumstances along with the observation.

In another embodiment, the device of the invention is provided with communications capability, such as that provided by a telephone line or radio frequency receiver, such that the device can retrieve information from other sources to store along with the time and date of the tick. For example, if host computer system is not equipped with a thermometer, it can nevertheless record the local temperature at the place where the user makes an observation (or in some other meaningful place) by retrieving that information automatically from a weather server such as WeatherBug from AWS, Inc. (www.aws.com). The host computer could also record financial headlines or data of almost any other description in the same manner.

Figures 12, 13:
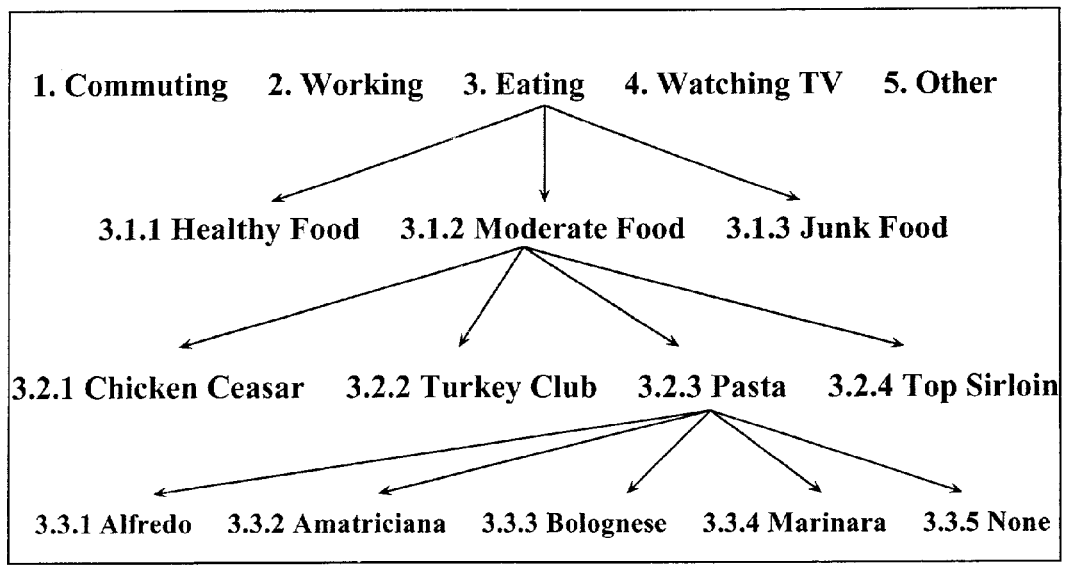
FIG. 12 is a tabular representation of an exemplary memory arrangement for storage of observation data in accordance with the present invention.
FIG. 13 is a schematic diagram depicting an exemplary concept of sublists in accordance with the present invention.

One memory arrangement for storing all this information is shown in tabular form in FIG. 12. The table shows a series of four observations, all made on the same day. Each row of the table is a single observation. The Key column allows this table to be cross-correlated with other tables. The Tick column records the tick list item number the user selected in that observation prompt. The other columns show the time and date of the tick, the location of the device (and therefore of the user) at the time of the tick, and the temperature at the time of the tick.

Those skilled in the art will recognize that separate circumstantial data for each observation prompt can be stored. The circumstantial data stored can also vary with the items selected, such that temperature is stored if the user selects one item, and local news headlines are recorded if the user selects a different item, for example.

8. Store Observations Remotely

In the exemplary main embodiment, all observations and tick lists are advantageously stored in the same device the invention employs to prompt for, record, and evaluate observations. Thus, especially when the desired sample set is large and the invention is recording additional circumstances with each observation, loss of or damage to the device of the invention could result in substantial loss of irreplaceable data. In an alternative embodiment, therefore, the device of the invention is provided with a means for communicating with a remote storage device. For example, a handheld computer can be provided with wireless communication capability, and a desktop computer can be provided with a network card and connection to a local area server. The process of the invention in this embodiment is correspondingly provided with steps for downloading observation data to remote storage locations so that the data are preserved even if the device of the invention is lost or destroyed. A further advantage of this embodiment is that several users can download observation data to the same location, where it can be compiled and analyzed together. A team of sales representatives, for example, can analyze their effectiveness, or a department of transportation can study traffic patterns and variability, correlating speed of traffic movement, location, and emotional states of drivers (road rage). The United States Department of Transportation Federal Highway Administration GPS-Based Travel Survey In Lexington Ky. (www.fhwa.dot.gov/ohim/gps/variability) demonstrates the utility of this embodiment. USDOT's study recorded only a trip description and route information as represented by GPS coordinates, and only recorded this information on the GPS-equipped handheld computer into which the user entered the trip descriptions. By including representative sampling of the user's mental states, as well as other conditions like temperature and time of day, USDOT could have achieved a much more thorough understanding of traffic patterns and driver behavior. By downloading this data wirelessly from each user, USDOT could have safeguarded it better and analyzed it as the experiment continued, making adjustments if necessary while adjustments were still possible.

9. Dependent Sublists and Multiple Selection

In the main exemplary embodiment of the invention, there is a tick list comprised of a single batch of items. After the user makes a single observation by selecting a single item from that single group, the invention generates a new time for a new observation prompt and waits. At the next prompt, the same single group is presented for selection. This embodiment might not collect as much information as it could, and might not allow the user to characterize the subject under observation with as much precision as is possible with little added effort.

Accordingly, an alternate embodiment of the invention allows the user to make multiple selections from a presented batch of items. For example, a user might select several items from a list of sensations he or she is feeling at the time, such as "cold," "wet" and "hungry" in a study of outdoor recreational enjoyment, or "billing time" and "talking on phone" in a sample of workplace activities.

Another alternate embodiment of the invention can gather additional information by also recording and presenting secondary batches of items, called sublists. Each sublist can be correlated with one or more particular main tick list items, such that it is only displayed to the user for selection if the user has previously selected one or more corresponding main tick list items. In this embodiment, the observation parameters subroutine 100 of FIG. 3 allows the user to enter a sublist for any or all items on the main list. Where there are multiple batches of items, if the user is to make selections contemporaneously there must also be an observation prompt for each group. As a result, the observation prompt scheduled in step 200 of the main sequence might be only the first of several observation prompts slated to occur at about the same time. Accordingly, it is referred to as the initial observation prompt. Subsequent observation prompts are triggered or skipped according to the results of adjacent, preceding observation prompts.

Still another embodiment allows sublists to be nested, such that any item on any sublist can also be associated with its own, still further detailed sub-sublist. To illustrate, if a main tick list is designed to sample the user's ordinary daily activities, it might consist of "commuting," "working," "eating," "watching TV," and "other." If a user wanted greater precision in the collected data regarding what he or she habitually eats, the user could enter a sublist under the main item, "eating." The user might enter "healthy food," "moderate food," and "junk food" as his secondary group, or sublist. Then, for still greater precision, the user could enter a tertiary group, or sub-sublist, describing potential "moderate foods" in detail, such as "chicken salad," "turkey sandwich," "pasta," etcetera. Additional list levels are of course possible too, and the most detailed sublist in the chain may be quite lengthy. FIG. 13 schematically depicts an exemplary arrangement of these list and sublist features.

Yet another embodiment allows multiple selection of items on each list level. Of course, these embodiments can be combined in their various permutations to create still other advantageous embodiments.

10. Multiple Independent Tick Lists

In addition to allowing sublists, the presentation of which is contingent and dependent upon selection of particular, associated items on the next higher level batch of items, another alternate embodiment of the invention allows the user to run multiple batches of items independently. Each independent group, or main tick list, can also have its own dependent groups, or sublists and sub-sublists. In this embodiment, the observation parameters subroutine allows the user to enter more than one main tick list and then create sublists for each item on each main list, and sub-sublists and so on, if desired. A user may wish to monitor her health with one set of main items and subitems, while independently monitoring productivity at work with an entirely distinct set of main items and subitems. Upon the initial observation prompt, she would select items from either her health list(s) or her work list(s), and the other list would be presented in a subsequent observation prompt.

11. Rotation and Exhaustion of Lists

The subsequent observation prompt mentioned in conjunction with running multiple independent tick lists can occur contemporaneously with the initial observation prompt, or much later. That is, upon any scheduled initial observation prompt, the invention can accept a selection or series of selections and then schedule a new prompt, shut down, and wait, or it can immediately execute another observation prompt for another batch of items.

In one alternative embodiment, all tick lists with any associated sublists are presented contemporaneously, such as in succession. This form of presentation is referred to as exhaustive because all lists are potentially exhausted before the series of observation prompts ends.

In another embodiment, only some lists are presented contemporaneously. This form of presentation is referred to as non-exhaustive because there is no potential to present all groups in any one series of observation prompts. This embodiment would be advantageous, for example, in the event that that there are a large number of lists and sublists, such that presenting all of them for selection would be overly tedious or time consuming. In this non-exhaustive embodiment, the invention executes contemporaneous observation prompts for only some of the groups of items.

In the non-exhaustive embodiment, furthermore, the groups for which contemporaneous observation prompts are executed can change depending on one or more factors. This form of presentation is referred to as rotating, because different lists are presented under different conditions. Skilled practitioners will recognize that the groups chosen for each batch of contemporaneous observation prompts in an exemplary rotating embodiment can be chosen at random or according to predetermined rules. For example, the groups presented can depend on external events such as weather or stock market performance, or internal events such as analysis of tick counts to date, or they can be presented according to a predetermined order (such as lists 1 and 2, then lists 2 and 3, then lists 3 and 1 again, and so on). In any non-exhaustive embodiment, maintenance of separate observation prompt counters for each batch of items is advantageous.

12. Run on Multiple Devices and Reconcile

It is likely that many users will have multiple computers, such as a portable computer as well as a desktop computer and a notebook computer. These computers can be connected together as described in FIG. 2. Those skilled in the art will also understand that the portable computer may be arranged as a wristwatch or other computer adapted to be worn on the body, such as that offered by Fossil, Inc. (www.fossil.com). Further, those skilled in the art will understand that the computers may also be connected together by wireless means, such as by radio frequency transmission or infrared beam transmission, to give but two examples. Under such circumstances, it is beneficial to provide a mechanism to permit the user to run the process of the invention on both devices simultaneously, thus allowing the user to make her observations on whichever computer is most convenient at the time of each observation prompt.

Embodiments hereinbefore described schedule only one initial observation prompt, wait until that initial observation prompt and any necessary contemporaneous observation prompts are executed, then schedule another initial observation prompt. Accordingly, this multi-device alternative embodiment benefits from modification of the scheduling subroutines described above, as well as changes in the exemplary main sequence. Specifically, it is advantageous to schedule multiple initial observation prompts sufficiently in advance to allow the computers to communicate with one another, such that initial observation prompts can be scheduled to occur contemporaneously on all computers.

FIG. 14 shows an alternate embodiment 40a of the exemplary main sequence of the invention. In this embodiment, the first step 100—obtaining the observation parameters—is unchanged. Then in step 200d, however, the invention employs the desired sample size S obtained in step 141 to schedule all initial observation prompts, not just one. Alternatively, it can schedule some but not all initial prompts, such as all prompts for that day, or that week. The calendaring software with which the computer systems of the invention are provided is capable of scheduling as many initial observation prompts as are necessary before actually executing any of them.

FIG. 15 shows the necessary modifications 200d to alternate embodiment 200b of FIG. 10. The differences between embodiment 200d and embodiment 200b are at the bottom of the flow chart. In the multi-computer embodiment 200d, the observation prompt count K is temporarily used as a count of initial observation prompts that have already been scheduled. The value of K is zero when this subroutine begins, having been set to zero in step 199 of FIG. 14. Likewise, the desired sample set size S obtained in step 141 of the observation parameter subroutine 100 functions as the desired number of initial observation prompts to be scheduled. In addition, to account for some missed ticks, the invention can augment the number of initial observation prompts to be scheduled S by adding a buffer count Y to the value of S. Use of the buffer count Y allows the user to plan ahead by accounting for inevitable missed ticks without unduly compromising the quality of the sample set. The value of the buffer count Y can be a default value, such as ten, or can be obtained from the user in an alternate embodiment of the observation parameters subroutine. The value of Y could also advantageously be determined by other methods easily discernable to those skilled in the art, such as adding one extra initial observation prompt for each missed tick in some prior observation session.

After scheduling a first, initial observation prompt in step 228 of FIG. 15, but prior to returning to the exemplary main sequence, in step 260 the invention compares the number of initial observation prompts that have been scheduled so far K to the desired number of initial observation prompts S (plus any buffer count Y). If in this comparison the invention determines that the number of initial observation prompts already scheduled K is less than the desired number of observations S, in step 261 the invention increments the count of initial observation prompts already scheduled K and returns to step 220 to schedule another initial observation prompt. If the desired number of initial observation prompts S (+Y) have already been scheduled, however, the invention in step 262 resets the value of counter K to zero, preparing the counter K for later use as the number of initial observation prompts actually executed. Then the subroutine terminates and returns to the exemplary main sequence 40a of FIG. 18. Corresponding modifications of other embodiments of this subroutine are easily arrived at by those skilled in the art.

This embodiment 200d of the scheduling subroutine is to be executed on one of the multiple computer systems. After that one computer system schedules all the necessary initial observation prompts, referring now to FIG. 14, in step 299 of the exemplary main sequence 40a it is beneficial to synchronize the computers. Synchronization is a method known in the art, as discussed above, and essentially involves swapping and reconciliation of data between two or more computers. Accordingly, the first computer advantageously prompts the user to do so.

Then, at each scheduled observation time, all the synchronized computers execute initial observation prompts substantially simultaneously. The user need answer only one. The others will register as missed ticks. In this embodiment, it is beneficial always to store the time of the initial observation prompt along with the selection or missed tick count.

Upon completion of the sample set (or periodically during the observation session), the data tables from each device are combined on at least one of the devices. Synchronization is a known way of combining the data.

Figure 16:
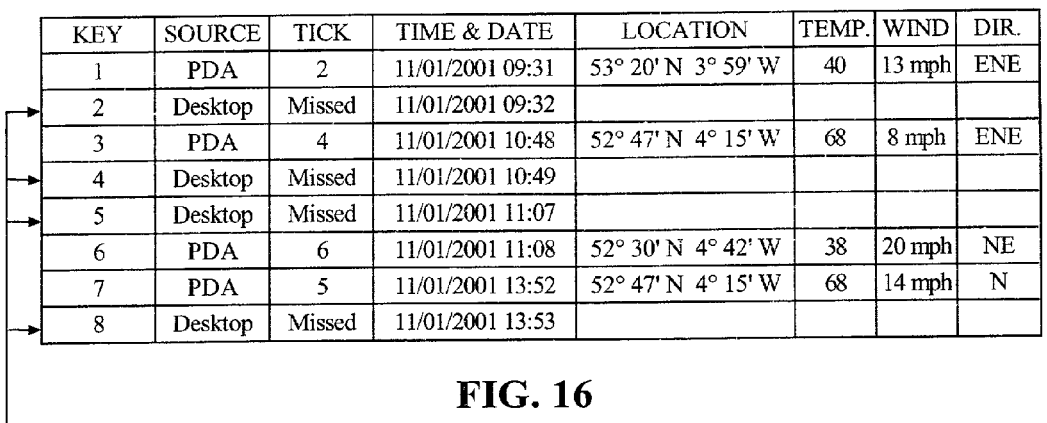
FIG. 16 is a tabular representation of an exemplary memory arrangement and reconciliation process for observation data in accordance with both the exemplary basic main sequence of the invention depicted in FIG. 3 and the alternate main sequence of the invention depicted in FIG. 14.

Then, the combined data is analyzed and advantageously placed in chronological order. FIG. 16 depicts a combined data table. Missed ticks with time stamps similar to actual observations are discarded. Accordingly, this embodiment of the invention would discard the data stored in the memory addresses represented in tabular form by the second, fourth, fifth and eighth rows shown in FIG. 16 because the time stamps on the missed ticks indicate that the user actually made an observation at those times on another computer. In the event that the user answered more than one observation prompt at the same or similar times, the invention advantageously can choose one and discard the others, either by default, at random, by prompting the user to choose, or by other methods easily discernable to those skilled in the art.

Those skilled in the art will recognize that there is no need to limit the number of computers to two or three. For large experiments or for sampling large workforces, for example, a greater number of computers would be desirable.

CONCLUSION

Although this invention has been described in terms of a certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. It is further understood that certain elements, steps, order, and decisions need not be performed as particularly described above, but can be performed by or with other ways to accomplish the spirit and scope of this invention. Accordingly, the scope of the invention is intended to be defined only by the claims that follow.

What is claimed is:

1. A method of conducting representative sampling, the method comprising:
    scheduling a plurality of human observation prompts at bias-controlled times;
    executing the scheduled observation prompts;
    accepting a selection of at least one input item, from a human user, based upon the observation prompts;
    maintaining tick counts for the selected items;
    using the tick counts for representative sampling purposes; and
    further including at least one additional step selected from the group consisting of:
        a. allowing users to control the items presented for selection at the observation prompts,
        b. attracting attention for the observation prompts with an attention-getting device,
        c. determining the bias-controlled times according to least one observation parameter such that the observation prompts will only be scheduled at the bias-controlled times that meet at least one of the observation parameters,
        d. counting the number of observation prompts upon which none of the items is selected,
        e. contemporaneously executing the observation prompts for more than one batch of items,
        f. storing circumstantial data regarding at least some of the observation prompts,
        g. presenting analysis of the counts after a plurality of observation prompts has been executed, and
        h. combinations thereof.

2. The method of claim 1 wherein the observation parameters are selected from the group consisting of:
    a. a latest permissible time,
    b. an earliest permissible time,
    c. a least one blackout day,
    d. a choice of modes for determining the bias-controlled times, and
    e. combinations thereof.

3. The method of claim 2 wherein the mode choices are selected from the group consisting of:
   a. a closed mode adapted to execute all of a number of observation prompts before expiration of a deadline
   b. an open mode adapted to ensure that the interval between observation prompts does not exceed a maximum duration, and
   c. combinations thereof.

4. The method of claim 3 wherein at least one of the modes is further adapted to ensure that the interval between observation prompts is at least a minimum duration.

5. The method of claim 1 wherein a presentation order of the batches of items is selected from the group consisting of:
   a. an independent order, whereby an observation prompt for each of the batches of items is executed,
   b. a dependent order, whereby observation prompts for some batches of items are executed only in the event that certain other items are chosen in previous observation prompts, and
   c. combinations thereof.

6. The method of claim 1 wherein an exhaustiveness of presentation of the batches of items is selected from the group consisting of:
   a. an exhaustive presentation, whereby observation prompts for all independent batches and dependent batches are executed contemporaneously;
   b. a non-exhaustive presentation, whereby observation prompts for independent batches and dependent batches are not all executed contemporaneously, the method for determining the batches for which observation prompts will be executed being predetermined.

7. The method of claim 6 wherein the method for determining the batches for which observation prompts will be executed is selected from the group consisting of:
   a. a random method, whereby the batches for which the observation prompts are executed are selected at random,
   b. a rotating method, whereby the batches presented in the observation prompts are presented on a rotating basis, and
   c. combinations thereof.

8. The method of claim 1 wherein the stored circumstantial data is selected from the group consisting of:
   a. at least one location,
   b. at least one weather condition,
   c. at least one vital statistic,
   d. at least one direction,
   e. at least one acceleration,
   f. at least one representation of chemical content,
   g. data received from a source other than the machine on which the observation prompt is executed, and
   h. combinations thereof.

9. A machine for conducting representative sampling and having computer-read able code arranged therein, the machine comprising:
   a central processor associated with the machine and adapted to schedule observation prompts and to cumulate a plurality of counts;
   a memory device associated with the central processor adapted to store batches of items and the counts; the memory also being adapted to store the times of the scheduled observation prompts at least until the times arrive;
   an output device associated with the machine and adapted to present the batches of items to a user at the scheduled times; and
   an input device associated with the machine and adapted to receive selections of the items;
   whereby the machine executes the scheduled observation prompts and users can select items thereupon,
   whereby the central processor cumulates counts associated with the items for representative sampling purposes; and
   further including at least one additional feature selected from the group consisting of:
   a. an adaptation of the computer-readable code such that the items to be presented in the observation prompts are subject to control by at least one user;
   b. an attention-getting device for attracting attention for observation prompts,
   c. an adaptation of the computer-readable code such that the central processor only schedules observation prompts at times that meet at least one of a plurality of parameters,
   d. a distinct counter cumulated by the central processor in the event none of the items is selected upon an observation prompt,
   e. an arrangement of the items in batches, such that observation prompts for different batches can be executed separately,
   f. at least one additional device associated with the machine for obtaining circumstantial data regarding observation prompts,
   g. an adaptation of the computer-readable code to analyze the counts and present the results after a plurality of observation prompts have been executed, and
   h. combinations thereof.

10. The machine of claim 9 wherein the additional devices associated with the machine are selected from the group consisting of:
   a. a location sensor,
   b. a thermometer,
   c. a barometer,
   d. a depth gauge,
   e. a humidity sensor,
   f. a radio frequency receiver,
   g. an altimeter,
   h. a compass,
   i. an accelerometer,
   j. a chemical content analyzer,
   k. a blood pressure sensor,
   l. a pulse sensor,
   m. a communication device adapted to receive data from a source other than the machine on which the observation prompt is executed, and
   n. combinations thereof.

* * * * *